United States Patent [19]

Lermann et al.

[11] 4,289,390
[45] Sep. 15, 1981

[54] BELLOWS TYPE FOLDING CAMERA

[75] Inventors: Peter Lermann, Naring; Karl Wagner; Herbert Schultes, both of Munich; Gunter Fauth, Unterhaching, all of Fed. Rep. of Germany

[73] Assignee: AGFA-Gevaert Aktiengesellschaft, Leverkusen, Fed. Rep. of Germany

[21] Appl. No.: 181,373

[22] Filed: Aug. 22, 1980

[30] Foreign Application Priority Data

Aug. 24, 1979 [DE] Fed. Rep. of Germany ....... 2934214

[51] Int. Cl.³ ............................................. G03B 17/04
[52] U.S. Cl. .................................................. 354/187
[58] Field of Search ............................... 354/158, 187

[56] References Cited

U.S. PATENT DOCUMENTS

| | | | |
|---|---|---|---|
| 2,168,977 | 8/1939 | Crumrine | 354/187 |
| 3,668,992 | 6/1972 | Harvey | 354/187 |
| 3,677,160 | 7/1972 | Harvey | 354/187 X |

*Primary Examiner*—Donald A. Griffin
*Attorney, Agent, or Firm*—Michael J. Striker

[57] ABSTRACT

The bellows type folding camera includes two pairs of collapsable struts symmetrically hinged inside the bellows between the camera housing and the displaceable objective support; the upper and lower struts are interconnected by transverse straps and only one of the struts is operated by an actuation handle whereby the movement of this one strut is transmitted to the remaining struts by a coupler and crank linkage and by the transverse straps.

13 Claims, 3 Drawing Figures

BELLOWS TYPE FOLDING CAMERA

BACKGROUND OF THE INVENTION

The present invention relates in general to bellows type foldable still cameras, and in particular to a camera having a housing, a displaceable objective support, flexible bellows arranged between the housing and the support, and a control mechanism for displacing the support between a collapsed position and an operative extended position, the mechanism having two symmetrically arranged strut systems each including a pair of upper and lower strut links for reinforcing the bellows in its operative extended position.

Cameras of this kind are known in numerous modifications and are still in use at the present time. In most cases, the struts for the displaceable objective are located outside the bellows and when folding the camera the pairs of strut links have to be first unlocked by exerting a synchronous pressure against actuation handles provided on corresponding halves of the strut links in each pair. In doing so, the user is exposed to the danger that his or her fingertips will get squeezed between the pivotable links of the struts.

Known are also cameras having the strut system arranged inside the bellows. This arrangement has the advantage that the unsightly external collapsable struts are dispensed with and the danger of squeezing the fingers by the strut linkage is eliminated. Nonetheless, even in this prior art structure of foldable cameras, a synchronous or consecutive operation of two handles is still necessary; this manipulation is of no consequence in the case of small cameras but in large size cameras it may become very uncomfortable.

A certain handling simplification has been already achieved in foldable cameras for small film formats by providing spring-biased struts whereby the springs are tensioned when the camera is folded. Upon actuating, the locking mechanism of the closed camera, the movable objective part together with the bellows springingly extend into the operative position. This solution, however, is unsuitable for large format cameras where it causes enormous difficulties. Due to a relatively large volume of air enclosed by the bellows, there must be provided light-tight channels for introducing air into the bellows during the opening process whereby precautions must be taken that the bellows do not become unduly deformed before the pressure balance is attained. For this reason, this design has been used only for cameras having a small volume of its bellows.

The design of the strut linkage encounters particular difficulties in cameras for large format films such as instant film cameras where it is desired to keep a high ratio between the depth of the open camera and the corresponding dimension of the closed camera.

SUMMARY OF THE INVENTION

It is, therefore, a general object of the present invention to overcome the aforementioned disadvantages.

More particularly, it is an object of the invention to provide an improved folding camera of the aforedescribed type which includes only a single handle for actuating the opening and the closing of the camera.

An additional object of the invention is to provide such an improved camera which enables the installation of its reinforcing strut systems inside the bellows even for large format designs.

A further object of the invention is to provide such an improved camera which has a high retraction factor of its bellows along the optical axis.

In keeping with these objects, and others which will become apparent hereinafter, one feature of the invention resides in the camera of the aforedescribed type in the provision of a displacement mechanism for the objective support which includes two pairs of lower and upper struts which are symmetrically hinged between the housing and the objective support, each strut being assembled of at least two sections hinged one to the other to rotate about a pivot axis into a collapsed position or an extended position in which the pairs of struts reinforce the bellows, the corresponding sections in the upper struts and respectively in the lower struts being rigidly interconnected by cross-pieces extending parallel to each other, actuation means including a cam drive arranged at one of the pairs of the struts, and coupling means for directly connecting the cam drive to the one pair whereby the other pair of struts is connected to the drive via the rigid cross-pieces.

The actuation means also includes a single hand operated lever coupled to the cam drive or a toggle or tongue arranged laterally on the camera housing and cooperating with the cam drive. Both pairs of struts are rigidly connected to a rotatable shaft which is also rigidly connected to a driving cam. The upper link of the strut pair adjoining the actuation lever is linked to the latter by means of a coupler and a lever. In the unfolded or expanded condition of the camera, the strut links hinged to the objective support abut against the latter and the actuation handle abuts against the housing of the camera. Preferably, the camera housing includes a hinged cover which is positively displaced during the opening or closing of the camera. The cover is hinged to the cam of the cam drive and is also provided with a control cam which during the closing of the camera causes via the strut linkage the objective support to retract before the movement of the cover. The cover has such a configuration that in the open condition of the camera it abuts against the objective support so as to provide an additional stay for the latter. The camera housing is also provided with a locking pawl which in the closed condition arrests the actuation handle or lever in the housing. The individual strut links in the expanded or operative position of the strut system slightly override the dead point of the hinges, thus ensuring a stable reinforcing position for the bellows and the objective support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
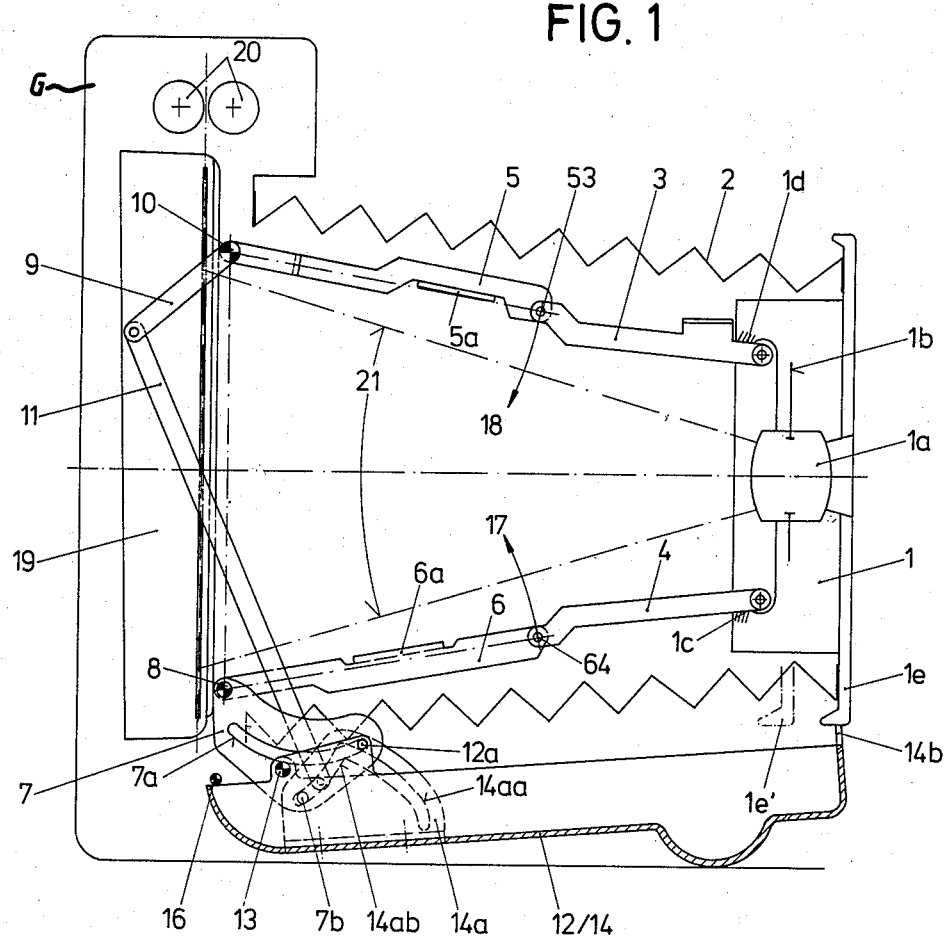
FIG. 1 is a sectional side view of a camera of this invention shown in its expanded or unfolded condition.
Figure 2:
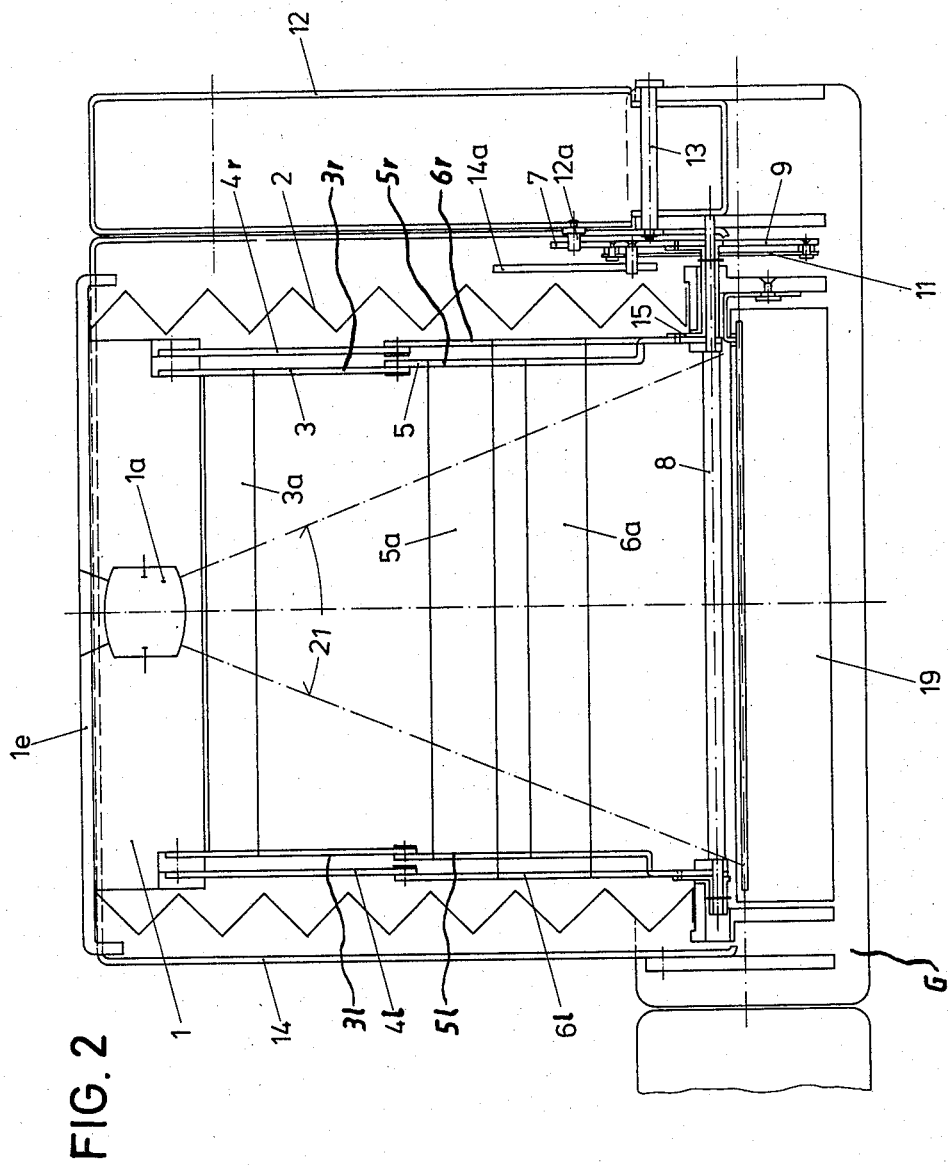
FIG. 2 is a sectional top view of the camera of FIG. 1.

FIGS. 1 and 2 show bellow type folding camera having a housing G, displaceable objective support 1 including an objective 1a and a shutter 1b and bellows 2 connecting in light-tight manner the film gate of the housing G with the front plate 1e of the objective support 1. Inside the housing G are arranged feeding rollers 20 for large format instant film supplied from a cassette 19. The optical axis and the limits of the path of light rays are indicated by dash and dot lines 21. In addition, the camera includes a mechanism for controlling the displacement of the objective support, the mechanism comprising, symmetrically arranged about the optical axis outside the limits of the light rays and hinged to the objective support 1, two upper front strut links 3 and two lower front strut links 4. The free ends of respective upper and lower strut links 3 and 4 are pivotably connected to corresponding pairs of rear upper strut links 5 and rear lower strut links 6 which in turn are pivotably connected to the housing G.

Each of the rear pairs of strut links 5 and 6 is rigidly interconnected by a transverse cross-piece or strip 5a and 6a formed preferably as a one piece component part. The actuation mechanism also includes a cam 7 which is connected via a side bracket or flanged bearing 15 to the rear lower strut link 6 and rotates therewith on a pivot axle 8. A crank 9 is rigidly connected to the end of the rear upper strut link 5 to rotate therewith on another pivot axle 10. A coupler 11 is linked to the free end of the crank 9 and connects the same via a pivotable connection to the cam 7 so that by turning the cam and the lower strut links the upper strut links are forcibly driven to rotate about the axis 10.

An actuation lever 12 is supported for rotation about an axle 13 mounted in the housing G and the lever 12 is provided with a driving pin 12 which engages the curved surface 7a of the cam 7. A housing cover 14 is supported on the housing G to rotate about an axis which is in alignment with the center axis of the axle 13 and the outer contours of the cover 14 correspond to that of the actuation lever 12. A lateral side portion of the cover 14 facing the cam 7 is formed with a cam member 14a defining a curved surface 14aa which cooperates with a guiding pin 7b projecting from the cam 7. The front edge 14b of the cover 14 abuts against the lower edge of the front plate 1e of the objective support 1.

The rotary movement of the front pairs of strut links 3 and 4 is limited by stop surfaces 1c and 1d and due to the fact that in the expanded or unfolded condition of the camera the crank 19 together with the coupler 11 positively rotate the upper struts 3 and 5 in pivot points 10 and 53 against the stop surface 1d and the cam 7 positively rotates the lower struts 4 and 6 about the pivot points 8 and 64 into abutment against the stop surface 1c, the four part linkage constituted by the objective support 1, the upper and lower pairs of struts 3, 5 and 4, 6 and the housing G, is brought into a very stable position. In this position, the actuation lever 12 abuts against a stop 16 and is arrested in this position by means of an unillustrated spring or latch. In this open position of the camera as illustrated in FIGS. 1 and 2, where the intermediate pivot points 53 and 64 of the upper and lower struts slightly override outwardly their dead center and consequently the struts 3, 5 and 4, 6 cannot collapse inwardly. Moreover, due to the fact that the struts are arranged inside the bellows 2, there is no danger that they be unintentionally brought into their collapsed position by an accidental touch of hand.

Figure 3:
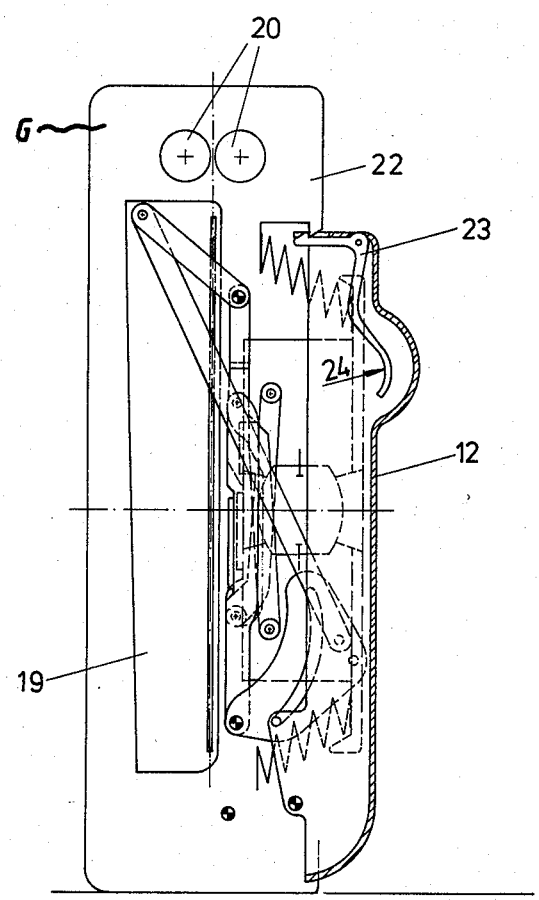
FIG. 3 is a sectional side view of a camera of this invention shown in its closed or folded condition.

The operation of the above-described camera is as follows:

In order to bring the camera from its unfolded open condition depicted in FIGS. 1 and 2 into its closed condition according to FIG. 3, the actuation lever 12 located at the right side of the camera is swung upwardly. In doing so, the driving pin 12a of the lever which is in engagement with the guiding curve 7a takes along the cam 7. Because of the positive connection via the flange bearing 15 between the cam 7 and the lower strut link 6, the latter rotates in the direction of arrow 17 and simultaneously positively drives via the coupler 11 and the crank 9 the upper strut links 5 in the direction of arrow 18. In this manner, the strut structure collapses inwardly at pivot points 64 and 53 and the objective support 1 is displaced rearwardly toward the housing G. Because the pivot axles 8 and 10 and the connecting cross-pieces 6a, 5a and 3a firmly connect the left-hand struts to those which are directly coupled with the actuation lever, the whole strut structure folds in a uniform and stable manner. In rotating the actuation lever 12 inwardly, the driving pin 7b of the cam 7 is first moved in a radial part 14ab of the curved surface 14aa and consequently the cover 14 remains so long in its open position until the actuation lever 12 is swung up by about 45° and the front plate 1e of the objective support 1 is moved to a position 1e' indicated by dashed lines. After passing this angular position of 45°, the driving pin 7b of the cam 7 enters a transverse part 14aa of the curved surface and starts rotating the cover 14 upwardly until it reaches its closed position.

As seen from FIG. 3, the actuation lever 12 in its closed position is locked to the front wall 52 of the housing G whereby the cover 14 preferably is not latched or locked to the housing but is guided to attain its closing position in contact with the housing slightly before the actuation lever 12 is compressed into its locked position so that the cover is subject to a slight bias. This arrangement has the advantage that in opening the camera by pressing the arresting latch lever 23 in the direction of arrow 24, the actuation lever 12 together with the cover 4 automatically spring off and the objective support 1 can be more easily displaced by the lever 12 into its operative forward position. From FIG. 3 it can be also seen that the cross-piece 6a leads the cross-piece 5a. Because the lower rear strut link 6 is driven directly by the cam 7, the cross-piece 6a during the opening movement presses against the cross-piece 5a thus assisting in spreading of the strut structure.

It will be noted that each of the elements described above, or two or more together, may also find a useful application in other types of constructions differing from the types described above.

While the invention has been illustrated and described as embodied in a specific example of a bellows type folding camera, it is not intended to be limited to the details shown, since various modifications and structural changes may be made without departing in any way from the spirit of the present invention.

For example, instead of the described actuation lever, a crank can be used by means of which the objective support is reeled in or out. It is also possible to employ a key by means of which the objective support is displaced in several strokes. The application of a driving electrical motor for retracting or extending the objective support is also possible. Moreover, a film-feeding mechanism or the image discharging mechanism in instant cameras can be also used for tensioning one or more springs by means of which upon releasing an arresting member the objective support is extended or withdrawn.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bellows type folding camera having a housing, a displaceable objective support, flexible bellows arranged between said housing and said objective support, and a mechanism for controlling the displacement of the objective support, said mechanism comprising two pairs of lower and upper struts symmetrically hinged between said housing and said objective support, each strut being formed of at least two sections hinged one to the other to rotate about an axis between a collapsable position and an extended position in which said pairs of struts reinforce said bellows, the corresponding sections of the upper struts and respectively of the lower struts being rigidly interconnected by crosspieces extending parallel to each other; actuation means including a cam drive arranged at one of the pairs of struts; and coupling means for directly connecting said cam drive to said one pair whereby said other pair of struts is connected to said drive via said cross-pieces.

2. A camera as defined in claim 1, wherein said actuation means includes a hand-operated lever hinged to a lateral side of the housing and being coupled to said cam drive.

3. A camera as defined in claim 2, further including an arresting pawl pivotably mounted on said housing for lockably engaging said actuation handle when the camera is in its closed condition.

4. A camera as defined in claim 1, wherein said actuation means includes a toggle hinged to a lateral side of said housing.

5. A camera as defined in claim 1, wherein said two pairs of struts are arranged within said bellows.

6. A camera as defined in claim 5, wherein said lower and upper struts are connected respectively to parallel lower and upper axles supported for rotation in said housing, and said cam drive being connected for joint rotation with said lower axle.

7. A camera as defined in claim 6, wherein one of said upper struts is connected to a crank which is linked to said cam by a coupler.

8. A camera as defined in claim 7, wherein said objective support is provided with stop surfaces for limiting the movement of said struts when said objective support is displaced into its extended position.

9. A camera as defined in claim 8, wherein said housing includes a lateral pivot axle for supporting an actuation handle and a stop member for limiting the rotary movement of said handle in the opening direction.

10. A camera as defined in claim 9, wherein said housing further includes a single piece or a multiple part cover supported on said housing for rotation about an axis which is in alignment with the lateral axle for said control handle, and a control cam formed on said cover and coupled to said driving cam so that the rotary movement of said handle during the opening or closing of the camera is transmitted to said cover.

11. A camera as defined in claim 10, wherein said control cam formed on said cover is provided with a radial curved section and with a driving curved section for engaging a pin projecting from said driving cam, said curved sections being arranged in such a manner that in closing the camera the objective support is retracted by said struts before the closing of said cover.

12. A camera as defined in claim 11, wherein said cover is provided with abutment means resting in the open condition of the camera on said objective support thus providing an additional reinforcement of the latter.

13. A camera as defined in claim 9, wherein said stop members are positioned such that in the open position of the camera the intermediate pivot points of respective strut sections override outwardly the dead center position thus contributing to the stability of the strut structure.

* * * * *